July 5, 1932.  R. GILLET  1,865,896
METHOD OF REAR SUSPENSION OF MOTOR CYCLES
Filed Aug. 8, 1930   2 Sheets-Sheet 1
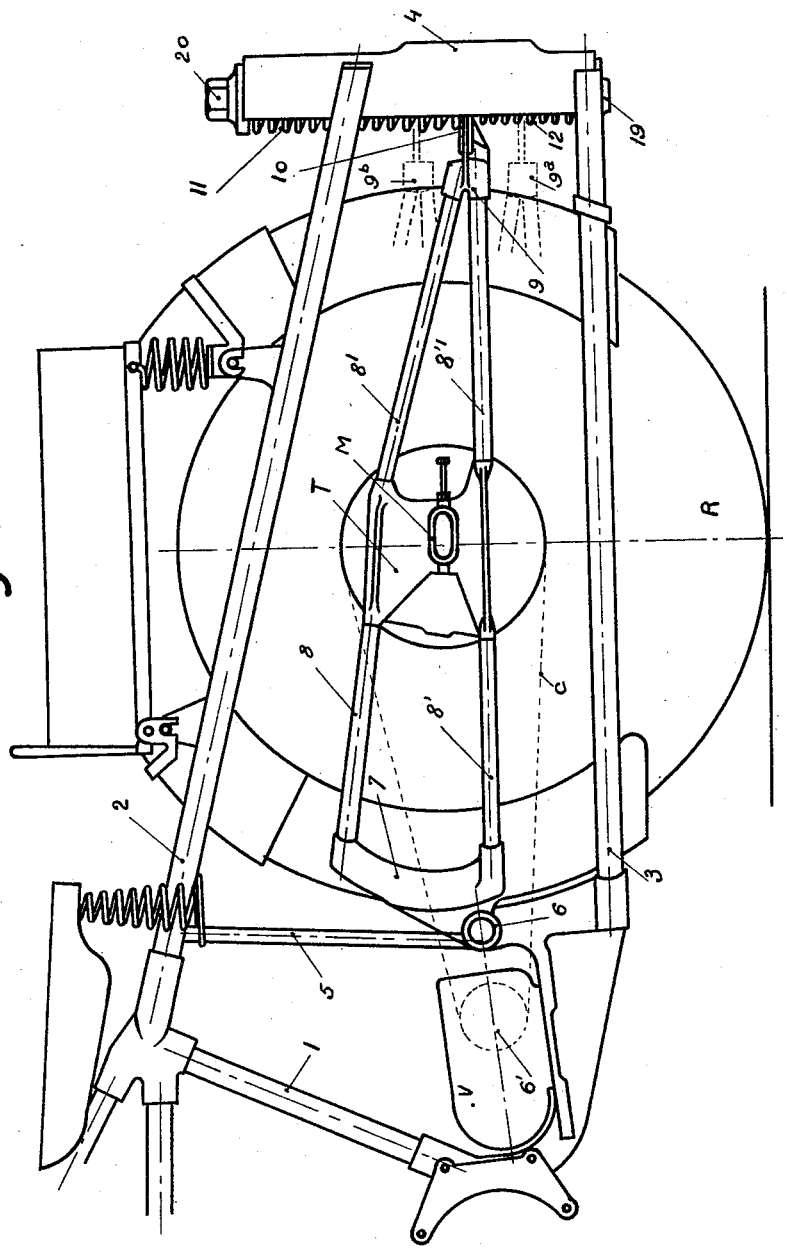
INVENTOR
René Gillet
BY
Robb & Robb
Attorneys July 5, 1932. R. GILLET 1,865,896
METHOD OF REAR SUSPENSION OF MOTOR CYCLES
Filed Aug. 8, 1930 2 Sheets-Sheet 2
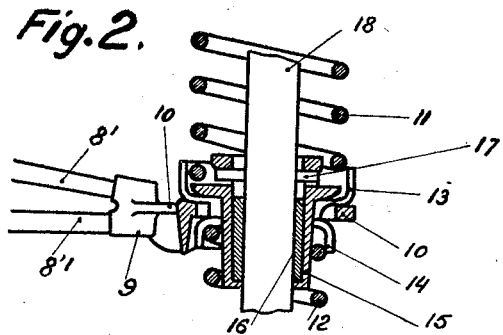
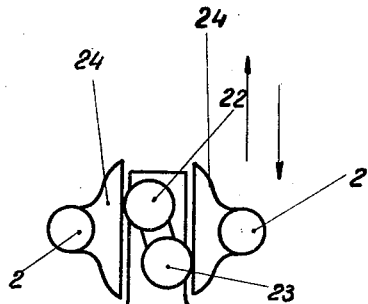
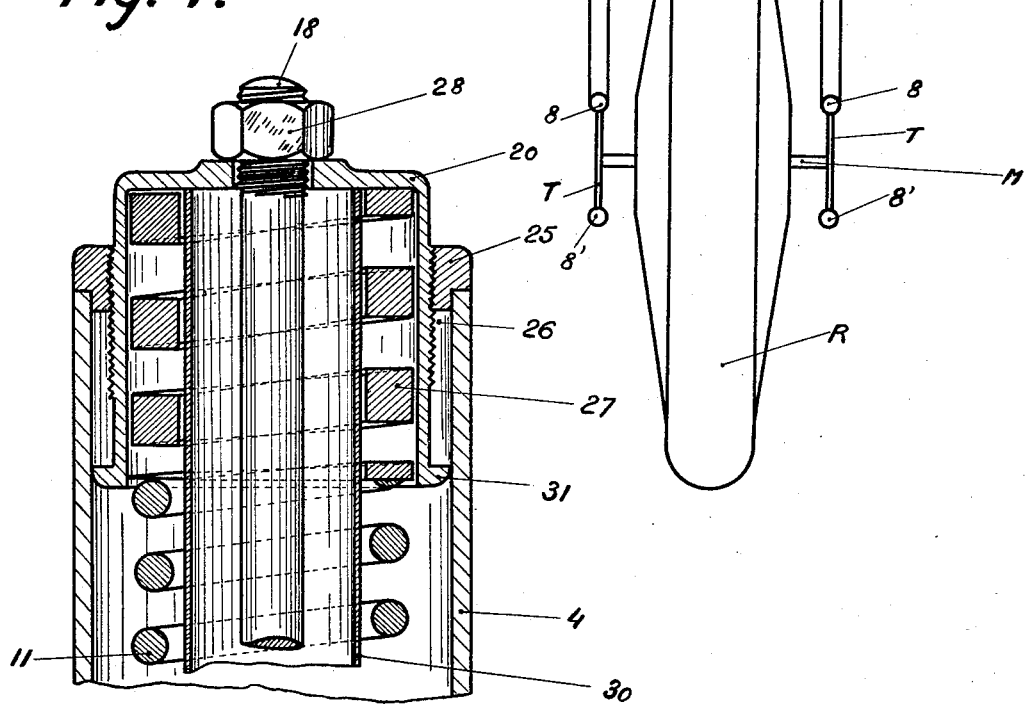
INVENTOR
René Gillet
By Robb & Robb
Attorneys Patented July 5, 1932

1,865,896

UNITED STATES PATENT OFFICE

RENÉ GILLET, OF MONTROUGE, FRANCE

METHOD OF REAR SUSPENSION OF MOTOR CYCLES

Application filed August 8, 1930, Serial No. 474,018, and in France October 7, 1929.

The object of the present invention is a method of rear suspension of motor-cycles which is applicable to bicycles, light cars, etc. by modifying the size, the strength and the arrangement of the constituent parts.

The principle of this invention, of which an adaptation is described in the present patent merely as an example without being limitative, is the combination on the frame, which is extended beyond the rear wheel, of an additional movable frame bearing the rear wheel, pivoting on the one hand about a fixed point of the machine (a chassis for instance), and elastically connected to another point of the fixed frame. (In the example described the elastic connection is at the rear end of the frame extension and is effected by springs or any other suitable method.)

On the accompanying drawings which illustrate the example described:

Figure 1 is a general side view of the rear of a motor-cycle equipped according to the new system.

Figure 2 represents the detail of the elastic clamping of the movable frame (supporting the rear wheel), to the stationary frame of the machine.

Figure 3 is an end view of an improvement.

Figure 4 is a sectional view of an improvement in the elastic connection.

The main frame 1 of the motor-cycle is prolonged towards the rear, beyond the rear wheel, R, by two tubular forks 2 and 3 both of which are outside the rear wheel, mud-guard, etc.

These tubes are rigidly interconnected at their rear ends by a tubular or semi-tubular part 4, for example, which also serves as a guide to the opposed springs 11 and 12 to which reference will be made later. Tube 5 of the fixed frame connects tubes 2 and 3 in front of wheel R and bears an eye piece 6 in which a pin, rigidly fixed to part 7 is free to turn. Two tubes are welded to part 7 and, through part T, support the hub of the rear wheel of the motor-cycle. Tubes 8 and 8' have tubular extensions $8_1$ and $8_1'$ the rear ends of which are made fast by stirrup 9, and this auxiliary or supplemental frame assembly supports the rear wheel and follows the jarring of the wheel in the vertical plane, pivoting around pin 6 and damping the shocks by limitation and braking of the movements as effected in a manner described hereinafter and which is the principal object of the present invention.

At its rear end, stirrup 9 is fitted with an ear 10 the movements of which are elastically limited, in a vertical direction, by two opposed springs 11 and 12 which bear, at points 19 and 20, on fixed parts the caps of part 4 for example. These springs act against one another at their butt ends by pressing against dished washers 13 and 14 and these clip the ear, 10, of the movable frame between them. The strength of these springs must, of course, be different in order to permit a slight to-and-fro movement of ear 10 in order to damp the shocks of the rear wheel and support assembly. By this means the rear portion of the motor cycle is made as resilient as the front part.

Moreover it is desirable to check the jerks of ear 10 between springs 11 and 12 as much as possible. A rod 18, passing through the axis of springs 11 and 12 and also bearing against 19 and 20, serves as a rubbing surface against two shoes 16 made of leather (or of any other suitable material) riveted or screwed to jaws 15 which are fitted, at their upper ends, with ears projecting outwards and resting on washer 13.

An opening is provided near the upper rim of each of these jaws and receives a tooth of a washer 17 which serves the purpose of keeping these jaws equally spaced apart. In this manner, whenever the springs press on the dished washers, the truncated cone shape of jaws 15 causes them to close in towards the axis of the assembly so that shoes 16 bear more or less against the central rod, 18, according to the force exerted by springs 11 and 12.

The shocks received by the rear wheel of the motor-cycle will therefor be transferred to ear 10 and practically absorbed entirely by the play of the opposed springs 11 and 12, so that the fixed frame is only subjected to oscillations considerably damped and longer and more gentle than the rough movements of motor-cycles on the bad running surface of ill kept roads.

In some cases the return-shock is so violent that the upper spring 11 becomes jammed solid, coil against coil, and the recoil is felt as in a solid whole. Thus it might be desirable to provide suitable means for further absorbing these particularly violent reactions and yet retain the resiliency of spring 11. A number of such means might be employed, such as a spring, or other yieldable buffer, any of which may be readily and easily adapted for use in conjunction with the main or primary shock absorbing parts.

For example, for the purpose of illustrating the perfected invention, a method of fitting with a spring has been shown. (Figure 4).

A tubular part 4 is shown in part of its length, up to the point, for example, where it clamps onto frame 2.

A flange 25 rests on this tube and screws on to a threaded portion 26 on the outer surface of cap 20.

A very stiff spring 27 is housed in cap 20 above spring 11.

Nut 28 bears on cap 20 and clamps rod 18 the other end of which is made fast in rest 19.

The inside tube 30 acts as a guide for the springs. There is grease between tubes 4 and 30 and in cap 20.

Adjustment is effected by loosening off 28, flange 25 is then rotated by means of notches or flats thus moving the cap inwards or outwards; nut 20 is then screwed home.

Flange 31, which terminates cap 20, serves as a guide to make the assembly rigid.

It is obviously very easy, by making the necessary changes, to adapt other damping or shock absorbing instrumentalities in lieu of spring 27 in order to overcome the vertical upward movements which might be too violent in view of the springiness the upper spring must possess.

In normal practice pivot 6 should be on the line joining the centers of the chain sprockets in order that the chain may remain symmetrical.

The advantages which may be derived from the present invention are obvious. Nothing which has been accomplished along these lines up to the present can compare, for comfort, with that now obtained and it is possible to convey fragile articles or delicate persons (on the tan-sad or in the side-car which also benefits by this new method of springing.) It should also be noted that it is possible to inflate the tires much more than is usual without suffering the discomfort of fully inflated tires (very violent shocks).

Up to the present, comparative comfort has been sought by inflating the tires insufficiently but this causes lack of stability when cornering with the additional risk of tearing the tire off the rim, splitting the canvas and ripping off the valve through tire-creep; all these risks are eliminated by the present invention which permits of inflating the tires sufficiently without interfering with comfort owing to the resiliency of the new invention.

A further improvement can be made in the fitting of the tan-sad or baggage carrier by providing the possibility of either removing the tan-sad or baggage carrier or of tilting them when withdrawing the rear wheel without inclining the machine as this is laborious work for one man and the weight of a motor-cycle is such as to make it awkward to handle in such a way.

What I claim is:—

1. A device of the class described comprising a main frame including spaced rearwardly extending members, a casing member rigidly connected to the free extremity of said rearwardly extending members, a pair of opposed spring members disposed in said casing, and an auxiliary frame pivotally connected to said main frame and extending rearwardly therefrom intermediate the rearwardly extending members aforesaid, the free extremity of said auxiliary frame being interposed between said spring members.

2. A device of the class described comprising a main frame including upper and lower rearwardly extending fork members, a casing disposed within said fork members and rigidly connected thereto at the free extremities thereof, a plurality of opposed spring members in said casing having different resiliencies, an auxiliary frame pivotally connected at one end to the main frame, said auxiliary frame being composed of a pair of laterally spaced side members each of which includes an upper and lower member connected together at their opposite ends, the free extremity of said auxiliary frame being interposed between said spring members, and a wheel mounting on said auxiliary frame intermediate the ends thereof.

3. In a vehicle suspension, a main frame, an auxiliary wheel-supporting frame pivotally connected to said main frame at one end and yieldably supported at the opposite end, and brake means for retarding the yieldable movements of said auxiliary frame.

4. In a vehicle suspension, a main frame, an auxiliary wheel-supporting frame carried thereby and movable relative thereto, yieldable means for resisting said relative movements, and braking means for retarding the action of said yieldable means.

5. In a vehicle suspension, a main frame, an auxiliary wheel-supporting frame carried thereby and movable relative thereto, yieldable means for resisting said relative movements, and friction braking means for retarding the action of said yieldable means.

6. In a vehicle suspension, a main frame, an auxiliary wheel-supporting frame carried thereby and movable relative thereto, yieldable means for resisting said relative movements, breaking means for retarding the action of said yieldable means, said braking means including clamping jaws, and a cooperating rod carried by said main frame on which the clamping action of said jaws is exerted.

7. In a vehicle suspension, a main frame, an auxiliary wheel-supporting frame carried thereby and movable relative thereto, yieldable means for resisting said relative movements, braking means for retarding the action of said yieldable means, said braking means including pivotable clamping jaws, and a cooperating rod carried by said main frame on which the clamping action of said jaws is exerted.

8. In a vehicle suspension, a main frame, a casing carried thereby, opposed spring members in said casing, a stationary rod disposed centrally of said casing, an auxiliary wheel-supporting frame having one end pivotally connected to said main frame and the other end interposed between said spring members and extending about said rod, and clamping jaws intermediate said rod and the end of said auxiliary frame, said clamping jaws also extending intermediate said rod and one of said spring members and having a lateral flange for engaging the other of said spring members for rocking the said jaws on the end of said auxiliary frame about the rod to effect a clamping action on the rod incident to pivotal movements of said auxiliary frame with respect to said main frame.

9. In a vehicle suspension, a main frame, a casing carried thereby, opposed spring members in said casing, a stationary rod disposed centrally of said casing, an auxiliary wheel-supporting frame having one end pivotally connected to said main frame and the other end interposed between said spring members and extending about said rod, clamping jaws intermediate said rod and the end of said auxiliary frame, and friction shoes carried by said jaws and adapted to engage said rod, said clamping jaws also extending intermediate said rod and one of said spring members and having a lateral flange for engaging the other of said spring members for rocking the said jaws on the end of said auxiliary frame about the rod to effect a clamping action on the rod incident to pivotal movements of said auxiliary frame with respect to said main frame.

10. In a vehicle suspension, a main frame, a casing carried thereby, opposed spring members in said casing, a stationary rod disposed centrally of said casing, an auxiliary wheel-supporting frame having one end pivotally connected to said main frame and the other end interposed between said spring members and extending about said rod, and tapered clamping jaws intermediate said rod and the end of said auxiliary frame, said clamping jaws also extending intermediate said rod and one of said spring members and having a lateral flange for engaging the other of said spring members for rocking the said jaws on the end of said auxiliary frame about the rod to effect a clamping action on the rod incident to pivotal movements of said auxiliary frame with respect to said main frame.

11. In a vehicle suspension, a main frame, a casing carried thereby, opposed spring members in said casing, a stationary rod disposed centrally of said casing, an auxiliary wheel-supporting frame having one end pivotally connected to said main frame and the other end interposed between said spring members and extending about said rod, clamping jaws intermediate said rod and the end of said auxiliary frame, said clamping jaws also extending intermediate said rod and one of said spring members and having a lateral flange for engaging the other of said spring members for rocking the said jaws on the end of said auxiliary frame about the rod to effect a clamping action on the rod incident to pivotal movements of said auxiliary frame with respect to said main frame, and spacing means for equally spacing said jaws with respect to said rod.

12. In a vehicle suspension, a main frame, a casing carried thereby, opposed spring members, dished washers for receiving the opposed extremities of said spring members in said casing, a stationary rod disposed centrally of said casing, an auxiliary wheel-supporting frame having one end pivotally connected to said main frame and the other end interposed between said washers and spring members and extending about said rod, and clamping jaws intermediate said rod and the end of said auxiliary frame, said clamping jaws also extending intermediate said rod and one of said spring members and having a lateral flange for engaging the other of said spring members for rocking the said jaws on the end of said auxiliary frame about the rod to effect a clamping action on the rod incident to pivotal movements of said auxiliary frame with respect to said main frame.

13. In a vehicle suspension, a main frame, an auxiliary wheel-supporting frame pivotally connected thereto, and means for cushioning the auxiliary frame in its pivotal movements with respect to said main frame, said means including a casing carried by said main frame, an adjustable cap member at one end of said casing, a stationary rod extending centrally through said casing and cap member and constituting means for retaining said cap member in adjusted position, a pair of opposed spring members in said casing encircling said rod and operatively associated with said auxiliary frame to yieldably resist movements of the latter, said spring members having different resiliencies, and separate cushioning means disposed in said cap member for cushioning said spring members.

14. In a vehicle suspension, a main frame, an auxiliary wheel-supporting frame movably connected therewith, and means for attenuating the movements of said auxiliary frame with respect to said main frame, said means including yieldable cushioning means, and brake means actuated by the resistance of said cushioning means to the movements of said auxiliary frame.

15. In a vehicle suspension, a main frame, an auxiliary wheel-supporting frame movably connected therewith, and means for attenuating the movements of said auxiliary frame with respect to said main frame, said means including yieldable cushioning means, and brake means associated with said cushioning means and comprising a stationary member and a movable clamping member adapted to be engaged therewith under the influence of said yieldable cushioning means incident to movement of said auxiliary frame.

In testimony whereof I have affixed my signature.

RENÉ GILLET.